(12) United States Patent
Barwich et al.

(10) Patent No.: US 8,481,147 B2
(45) Date of Patent: Jul. 9, 2013

(54) ABRASION RESISTANT DECORATIVE SHEET, ESPECIALLY OVERLAY, HAVING A PARTICULAR OPTICAL EFFECT

(75) Inventors: Stefan Barwich, Laichingen (DE); Elmar Beck, Heroldstatt (DE)

(73) Assignee: Dakor Melamin Imprägnierungen GmbH, Heroldstatt (DE)

( * ) Notice: Subject to any disclaimer, the term of this patent is extended or adjusted under 35 U.S.C. 154(b) by 716 days.

(21) Appl. No.: 12/141,469

(22) Filed: Jun. 18, 2008

(65) Prior Publication Data

US 2009/0011193 A1 Jan. 8, 2009

(30) Foreign Application Priority Data

Jun. 19, 2007 (DE) .................. 10 2007 028 603

(51) Int. Cl.
*B32B 33/00* (2006.01)
(52) U.S. Cl.
USPC ..... 428/207; 428/195.1; 428/201; 428/211.1; 428/322.2; 428/323
(58) Field of Classification Search
CPC ...................................................... B32B 33/00
USPC ........................................................ 428/342
See application file for complete search history.

(56) References Cited

U.S. PATENT DOCUMENTS

| | | | | |
|---|---|---|---|---|
| 3,968,291 A | * | 7/1976 | Chevallier | 428/203 |
| 4,801,495 A | * | 1/1989 | van der Hoeven | 442/412 |
| 5,019,202 A | * | 5/1991 | Kawahata et al. | 156/277 |
| 5,047,282 A | * | 9/1991 | Mier | 428/204 |
| 6,093,473 A | * | 7/2000 | Min | 428/147 |
| 2002/0117277 A1 | * | 8/2002 | Johnson et al. | 162/124 |
| 2006/0134405 A1 | * | 6/2006 | Dohring | 428/342 |
| 2006/0251870 A1 | | 11/2006 | O'Brien et al. | |
| 2007/0116933 A1 | * | 5/2007 | Kobayashi et al. | 428/172 |

FOREIGN PATENT DOCUMENTS

| | | |
|---|---|---|
| DE | 19903914 A1 | 8/2000 |
| DE | 103 34 008 | 2/2005 |
| EP | 1 068 394 B1 | 8/2000 |
| EP | 1595718 A1 | 11/2005 |
| WO | WO2007/048731 A1 | 5/2007 |

* cited by examiner

*Primary Examiner* — Gerard Higgins
*Assistant Examiner* — Christopher Polley
(74) *Attorney, Agent, or Firm* — Brinks Hofer Gilson & Lione

(57) ABSTRACT

The invention relates to an abrasion-resistant decorative sheet (1), in particular an overlay for the production of a laminate floor or of an abrasion-resistant furniture surface, comprising a paper layer (3) provided on one side with a print layer (2), comprising an impregnation (3a) formed from a first plastic mixture and comprising a layer (4) which is formed from a second plastic mixture and contains particulate abrasion-reducing material. In order to provide such a decorative sheet (1) which meets the high requirements in line with standards with regard to its abrasion resistance and permits a high-quality and clear printed image and has an appealing optical impression or an optical special effect, such as a metallic or nacreous appearance, it is proposed to apply the layer (4) formed from the second plastic mixture and containing particulate abrasion-reducing material to that side of the paper layer (3) which is opposite the print layer (2). A production process for the decorative sheet (1), a laminate formed from the decorative sheet (1) and a use for the production of laminate floors or abrasion-resistant furniture surfaces are likewise claimed.

13 Claims, 1 Drawing Sheet

US 8,481,147 B2

ABRASION RESISTANT DECORATIVE SHEET, ESPECIALLY OVERLAY, HAVING A PARTICULAR OPTICAL EFFECT

CROSS REFERENCE TO RELATED APPLICATIONS

This application claims priority to German patent application 10 2007 028 603.3, filed Jun. 19, 2007.

FIELD OF THE INVENTION

The present invention relates to an abrasion resistant decorative sheet, in particular an overlay, for the production of a laminate floor or a furniture surface. The present invention also relates to a process for the production of such an abrasion resistant decorative sheet.

BACKGROUND OF THE INVENTION

European patent EP 1 068 394 B1 discloses a process for impregnating decorative papers used for the production of highly abrasion-resistant laminate floor materials. In this process the decorative paper is first moistened with an amino resin and impregnated thereby, the amount of the resin being regulated by means of metering rolls, and a layer of an amino resin in a special dispersion then additionally being sprayed onto the top of the moistened wet decorative paper.

The product of the known process, a decorative paper having a uniform coating which comprises an amino resin with particulate silicon carbide, corundum or alumina and comprises no cellulose derivatives, can be pressed onto an HDF substrate board on a short-cycle press at 180° C. while maintaining a press time of 20 seconds. In an abrasion test corresponding to the standard DIN EN 13329, this board had an abrasion value of IP 12 000.

The abrasion test corresponding to the standard DIN EN 13329 envisages that two friction wheels equipped with emery paper strips are used in a special test apparatus in the holder of which the test specimens are clamped, where they are brought into contact with the friction wheels. After 100 revolutions in each case, the test specimens are checked for abrasion, and the emery paper is replaced by fresh emery paper after 200 revolutions in each case. The test is continued until the so-called initial abrasion point (IP) is reached. This is understood as meaning the point at which a decorative print present in the test specimen is worn through for the first time in a clearly detectable manner under the conditions defined in detail in the standard. The number of revolutions required for reaching this point is recorded and is a measure of the abrasion resistance. The IP resistance of a laminate floor to abrasion is then stated in abrasion classes according to DIN EN 13329 as shown in Table 1.

TABLE 1

| Abrasion class | Requirement (IP value) Number of revolutions | Application |
| --- | --- | --- |
| AC1 | at least 900 | Bedroom |
| AC2 | at least 1500 | Living room |
| AC3 | at least 2000 | Lobby Small office |
| AC4 | at least 4000 | Hotel |
| AC5 | at least 6000 | Department store |

A similar classification is also found in the standard DIN EN 438 "High-pressure decorative laminates (HPL)—sheets based on curable resins (laminates)—Part 2: Determination of the properties".

In European patent EP 1 068 394 B1, no print layer on the decorative paper is mentioned for the product of the process described. However, it is customary in practice to use in addition to unprinted tinted, papers, printed papers whose printed image is then covered by the particle-containing abrasion-resistant layer. In this process, it is possible for the optical impression of the decorative sheet to suffer in a disadvantageous manner. Any special optical effects strived for are thus reduced, lost, or not achievable at all.

DE 103 34 008 A1 describes a process for coating substrate materials of different gloss zones and a substrate material produced by said process. According to this process, the substrate material is subjected in succession to a plurality of printing processes with matte and glossy coatings being either colorless or colored when applied. In particular, a decorative sheet having different gloss zones is produced.

The furniture and laminated flooring industries are continually striving to improve or enhance the performance of its products, such as abrasion resistance and optical effects, without significantly impacting either cost or ease of manufacturing. In this regard there is a need in the industry to continually develop novel materials and new manufacturing processes for the production of abrasion resistant sheets, such as overlays, to be used in laminate flooring or furniture surfaces.

SUMMARY OF THE INVENTION

It is the object of the present invention to provide a decorative sheet, which meets the requirements of the standards DIN EN 13329 and DIN EN 438 with regard to its abrasion resistance and which has a high-quality clear printed image with appealing optical impression. This means in particular that, with the aid of the imprinted overlay, additional special optical effects are achievable without substantially affecting the printed image of a decorative paper underneath. It is another object of the present invention to provide a correspondingly suitable process for producing this sheet.

According to one embodiment of the present invention, the object of the invention is achieved if the layer formed from the second plastic mixture and containing particulate abrasion-reducing material is applied to the side of the paper layer which is opposite the print layer or is applied according to the process described herein.

The print layer of the decorative sheet according to the invention forms the uppermost layer of the laminated finished product. It is possible for the impregnation formed from the first plastic mixture, which is carried out in particular after the printing, to have a strengthening effect not only on the paper, but advantageously also on the print layer, especially when the paper layer has a specific base paper mass in the range from 15 to 35 g/m². The print layer itself can preferably be produced by gravure printing.

Direct or indirect gravure printing, flexographic printing, offset printing or rotary screen printing can be used as a printing process according to the present invention. Gravure printing is a printing process in which printing elements are in the form of depressions made in a printing plate. A print support, which is in particular cylindrical and metallic at least on the surface (e.g., comprises a copper layer), is dipped with a part of similar circumference into a trough containing a low-viscosity ink. The excess ink is scraped off the raised, nonprinting areas of the print support by means of a doctor blade. Webs which cover the cylinder like a waffle-like net have the function of guiding the doctor blade cleanly over the large areas to be printed. The printing ink is then only present in the depressions or so-called wells. The material to be printed, which is preferably paper or plastic sheets, as well as the print support are then pressed mechanically against one another, with the ink from the wells adhering to the material. By means of more or less deep wells, ink layers of different thickness can be printed in gravure printing, with the end result being a "light/dark" change in tonal values. This is not possible in other printing processes. In this way, gravure printing also delivers very intense, saturated colors, which are not achievable, for example, in flexographic or offset printing. The advantage of gravure printing is therefore that it is possible to achieve color prints, which are distinguished by outstanding brilliance, as demonstrated by a saturated color effect in the shadows and at the same time a fine gradation of tonal value in the bright areas.

Depending upon the size and depth of the wells, which can be produced by an etching process, by electromechanical engraving, or with a laser beam, it is possible to make a distinction in gravure printing between conventional, semi-halftone, and halftone processes. In the conventional process, the wells are of the same size and of different depth. In the semi-halftone process, the wells are of both different size and depth. In the halftone process, the wells vary in depth but not in size.

In electromechanical engraving, a pyramidal diamond needle dips into the surface of the printing plate, consisting in particular of copper, and cuts out a well. Depending on the depth of penetration, it also produces another surface. The process is therefore both area-variable and depth-variable (semi-halftone). The ink acceptance capacity of a well determines the dimensions of the printed dot. It is necessary for a dot to have larger dimensions to exhibit deeper shades than for lighter shades. Accordingly, it is necessary for the print density in the region of deeper shades to be greater overall. The dimensions of the dot are decided not only by the surface dimensions of the respective well, but by its ink acceptance capacity or its scoop volume. To achieve these points, a screen in the range from 40 to 60 lines per cm, i.e., a number of wells in the range from 1600 to 3600 per cm$^2$, is preferred according to the invention. The wells are spaced in the range from about 165 to 250 μm. The thickness of the applied ink layer may vary in the range from about 4 μm in bright areas to about 40 μm in dark areas.

In relation to one embodiment of the invention, gravure printing can be realized both as a direct process and preferably also as an indirect process. In the indirect process, which is also referred to as pad printing, the ink is first applied to a so-called printing plate, which contains the wells for receiving the printing ink. As described above for the direct process, the ink is then scraped off the raised, nonprinting areas of the print support by means of a doctor blade. At the same time, a so-called pad—for example preferably consisting of silicone rubber—moves over the printing plate filled with ink, is lowered there, and is pressed onto the plate so that it picks up the printed image. The printed image is then transferred to the material to be imprinted, by a procedure in which the pad is pressed onto the material to be imprinted. Here, virtually 100% ink transfer can be achieved. The imprinting can advantageously be carried out on irregularly shaped material surfaces, and on mechanically sensitive surfaces. It is also possible to apply multiple prints by a wet-on-wet process without intermediate drying of the prints.

In a pad printing process, plates and ink can be changed within a few minutes and, depending on the ink type used, extremely high resistances to mechanical abrasion and chemicals can be achieved by the cured prints. The latter is true especially with the use of two-component inks which, prior to printing, are mixed with a curing agent that reacts chemically with the ink to induce crosslinking of the ink film that forms. According to one embodiment of the invention, plates having a depth of 20 to 35 μm can be used in pad printing. The resulting printed ink film has a thickness of about 7 μm when conventional inks are used. However, the print layer thickness can be increased by printing multiple layers.

In the production of optical effect sheets, the particle size of the colored pigments used also plays an important role. The optical effects achievable with the use of various particle sizes are substantially different. Relatively opaque, silky glosses can be achieved with very fine fractions (particle size <5 μm), while a more sparkling effect is established with increasing particle size (up to 125 μm). Increasing particle size also results in a decrease in the hiding power exhibited by the ink. In the printing process, the screen rulings and well geometries should be adapted to the particle size exhibited by the pigments. For example, a screen ruling in the range from about 40 to 60 lines per cm can be advantageously used for pigment particle sizes in the range from 10 to 125 μm. In the case of pigment particle sizes in the range from 5 to 25 μm, however, larger screen rulings in the range from 70 to 100 lines per cm are recommended.

In an electromechanical engraving process, with the same surface area of a well, the depth depends on the tip angle of the needle. With a relatively small tip angle, a larger well volume is cut than with a larger tip angle. This tip angle should be about 110° to 120°, i.e. smaller than the usual standard angle of 130°, particularly with the use of the solvent-based inks used according to the present invention, so that a larger scoop volume is produced. In the case of water-based inks, which have a lower viscosity than solvent-based inks, the tip angle can be greater than the standard angle or just as large, i.e., 130° to 140°. Regarding the well shape, this should preferably be in the form of a so-called transverse well, which can be achieved by rotating the impression cylinder more slowly during engraving. This gives a compressed rhombus in which the diagonal running along the cylinder is larger than the diagonal running in the circumferential direction of the cylinder.

In the case of etched wells, the depth of the wells may be from about 50 to 55 μm, whereby the ratio of the well width to the width of the webs located between the wells should be from about 6:1 to 12:1.

Further areas of applicability will become apparent from the description provided herein. It should be understood that the description and specific examples are intended for purposes of illustration only and are not intended to limit the scope of the present invention.

BRIEF DESCRIPTION OF THE DRAWINGS

The drawings described herein are for illustration purposes only and are not intended to limit the scope of the present invention in any way.

DETAILED DESCRIPTION OF THE INVENTION

Figure 1:
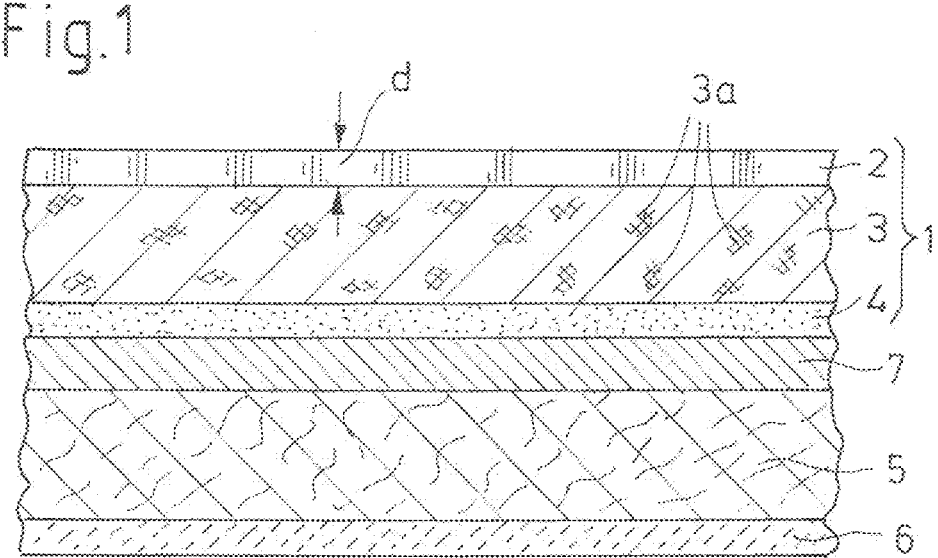
FIG. 1 shows a schematic cross-sectional diagram of a preferred embodiment of an abrasion-resistant decorative sheet according to one embodiment of the invention, which is laminated with a substrate.

The following description is merely exemplary in nature and is in no way intended to limit the present disclosure or its application or uses. It should be understood that throughout the description and drawings, corresponding reference numerals indicate like or corresponding parts and features.

In order to achieve an improvement of the printed image and reliably to avoid creasing, it is intended first to apply a primary coating to the substrate material and then to place the printing ink exactly over the desired regions of the decorative printed image in the subsequent printing in at least two printing units by appropriately designed impression cylinders and the adjustment thereof in exact register. In one embodiment, impregnated paper which has been impregnated with combinations of melamine resin, urea resin, acrylate dispersion, acrylate copolymer dispersion, polyester resins or the like or has already been provided with resin feeds on the paper machine is intended as a substrate material for this purpose. Direct or indirect gravure printing, flexographic printing, offset printing or rotary screen printing can be used as printing process which is effected in particular by means of a curable varnish which can be adjusted with a high-hiding pigment preparation and acquires a desired coloration with colored pigment preparations. Since the known substrate material is intended for lamination with furniture sheets, said process does not envisage the application of a layer which contains particulate abrasion-reducing materials as previously described in EP 1 068 394 B1.

During work carried out in the development of the invention with the aim of enabling the optical impression of furniture surfaces and in particular laminate floors with metallic or mother of pearl effects to be better represented, it was discovered that, with the currently used printing technology, a desired "iridescent" or similar special effect can be achieved on printing on a decorative paper in particular so that this is lost when an overlay which is intended simultaneously with the decorative function also to represent the function of an abrasion-resistant useful layer is pressed onto the decoration side of a substrate board, e.g. of an HDF substrate board.

As initially evident from FIG. 1, an abrasion resistant decorative sheet 1, in particular an overlay 1 for the production of a laminate floor, comprises a paper layer 3 provided on one side with a print layer 2, an impregnation 3a which is formed from a first plastic mixture and with which the paper layer 3 is provided, and a layer 4 which is formed from a second plastic mixture and contains a particulate abrasion-reducing material.

The paper layer 3 may have a specific base paper mass in the range from 15 to 35 g/m² and is first imprinted with the print layer 2 in the gravure printing process. For this purpose, a printing plate 10 shown in FIG. 2 can be used. The thickness (d) of the applied print layer 2 may be in the range from 4 μm to 40 μm.

The paper layer 3 provided with the print layer 2 is impregnated. A first synthetic resin used for this purpose can preferably be an amino resin which is preferably a melamine-formaldehyde oligomer present in liquid form. It is advantageously also possible to ensure that a polymeric dispersion is mixed with the amino resin before the impregnation for making the impregnating resin flexible. Such a dispersion may comprise, for example, at least one of acrylate, methacrylate, or vinyl acetate homopolymer(s) or styrene-acrylate, styrene-methacrylate, or polybutadiene-styrene copolymer(s). This dispersion leads advantageously to the treated impregnated material not only being more flexible, but also having greater adhesion to the further layer 4, which is to be applied in the next process stage and which can be more readily applied thereby. In addition, a curing agent for promoting the crosslinking and optionally a wetting agent can be mixed with the amino resin before the impregnation. An impregnating auxiliary agent can also be mixed with the synthetic resin serving for the impregnation prior to the application. This brings about a reduction in the surface tension in the synthetic resin system, with the result being that the penetration time of the resin into the pores of the paper is shortened and the homogeneity of the impregnation is promoted.

For the impregnation, the paper layer 3 is first saturated with the first synthetic resin mixture. In particular, the synthetic resin is first allowed to wash over the back of the decorative paper 1. This synthetic resin then penetrates into the decorative paper 3 without further application in a so-called breathing zone. Then the paper is laden again with the first synthetic resin in an immersion zone. For realizing this process stage, it is possible to use a customary impregnating unit, the amount of resin being regulated by means of metering rolls. The amount applied for the impregnation may be in the range from 40 to 120 g/m², preferably in the range from 60 to 90 g/m².

In a subsequent process stage which follows directly in the manner of a wet-on-wet application and requires no second machine pass, a layer 4 which contains a second synthetic resin and particulate abrasion-reducing material is then applied to the moist impregnated material. This is followed by a heat treatment for curing the synthetic resins and for removing the moisture from the moist coated impregnated material. Residual moisture present after curing and drying may be in the range from 3% by mass to 9% by mass. For drying, a continuously operating convection belt dryer, such as a lay-on-air dryer with time, temperature, and circulated air control, can be used in a gentle treatment but an efficient and precise procedure.

The specific mass of the layer 4 containing particulate abrasion-reducing material may assume a value in the range from 3 to 70 g/m² after drying, while the total decorative sheet 1 as a finished product can preferably have a specific mass in the range from 60 to 250 g/m².

The second synthetic resin used for applying the layer 4 can advantageously likewise be an amino resin, preferably an optionally methylated melamine-formaldehyde oligomer present in liquid form. Advantageously, a high resistance to chemicals, good adhesion to the other layers and low formaldehyde emission can be established in the finished decorative sheet 1. During the processing, the system is distinguished by good leveling on the surface to be coated. During the impregnation and during the coating application, an optimum viscosity of the synthetic resins used can advantageously be established by adding and mixing with water.

The particulate abrasion-reducing material used in the layer 4 can preferably be corundum, silica or silicon carbide. This material may be used preferably with a particle size distribution in the range from about F 120 to F 280 according to the standard of the FEPA (Federation Européene des Fabricants de Produits Abrasifs) for abrasive particle sizes. The mean value of the particle size in the case of the particle size distribution F 280 is in the range of 36.5+/−1.5 μm. However, it would also be possible to use comparable particle sizes subject to other standards (JIS R 6001, ANSI) or to form a bimodal particle size distribution curve by mixing two of these particle sizes in order to achieve a higher packing density of the particles.

The proportion of the particulate abrasion-reducing material and/or the amount applied in the layer can advantageously be established depending on the abrasion resistance (Table 1) of the sheet 1 which is to be achieved. The higher the abrasion resistance to be achieved, the greater must be the chosen proportion of the particulate abrasion-reducing material and/or the chosen amount applied in the layer 4. Abrasion values in the classes AC3, AC4 and AC5 can be achieved without problems. This proportion of particulate abrasion-reducing material may being the range from 5 to 80 parts by mass, preferably in the range from 20 to 40 parts by mass when based on 100 parts by mass of the second synthetic resin or synthetic resin mixture. However, the abrasion resistance is determined not only by the particle-containing layer 4 but by a synergistic cooperation with the impregnated paper layer 3 present on top and the print layer 2 present thereon.

The application of the layer 4 which contains the particulate abrasion-reducing material is applied according to the invention on that side of the paper layer 3 which is opposite the print layer 2, for example by means of a nozzle which has become known by the name ARP nozzle. It is also possible to regulate the amount applied with the aid of metering rolls.

The finished decorative sheet can then be laminated, together with an imprinted and impregnated decorative paper 7. For example, for the production of a floor laminate, in a manner known per se with a substrate 5, such as pressed onto an HDF substrate board in a short-cycle press. Said HDF substrate board can be provided on its underside with a so-called counteracting paper 6.

Figure 2:
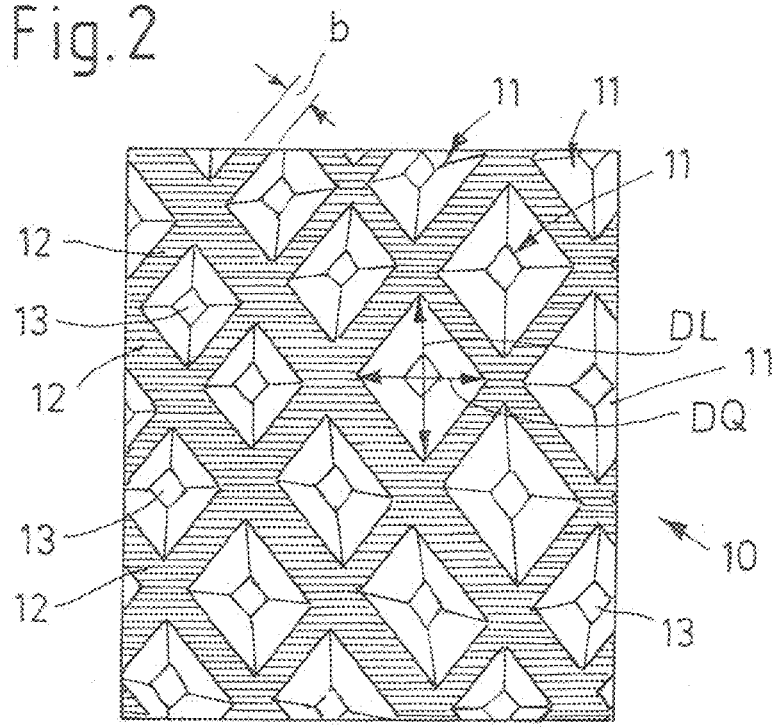
FIG. 2 shows an enlarged plan view of a printing plate which can be used according to the invention for producing a print layer of an abrasion resistant decorative sheet according to one embodiment of the invention.

As illustrated in FIG. 2, the print layer 2 can be produced by direct or indirect gravure printing, with an electromechanically engraved printing plate 10 preferably being used.

The gravure printing can be used especially with a semi-halftone and halftone process. The section of the surface of the printing plate 10 which is shown in FIG. 2 indicates a semi-halftone process in which wells 11 engraved in the plate are of different size and depth. Consequently, a width (b) of webs 12 present between the wells 11 also varies.

Inks of different types, such as universal or standard inks or polymeric two-component inks that include a crosslinking curing agent, can be used for the printing. It is also advantageously possible to introduce effect pigments into the ink, such as those of the metal oxide-mica pigment types, which are based on a metal, e.g., aluminum particles, or based on microcrystalline glass prisms.

These effect pigments are available in various particle sizes, the effects associated with the particle size differing as already described above. The differing effects range from silk gloss through nacreous effects to metallic or glitter effects.

For example, special inks which can be used together with amino resins are available from Hartmann Sun Chemicals (Germany) for achieving a nacreous effect. On contact with formaldehyde and melamine, as may occur in the impregnation 3a of the paper layer 3, these inks are stable. They are preparations based on protein/acrylate, which contain pigments having a particle size in the range from 10 to 40 µm at a solids content of about 33 to 41% and are delivered in highly viscous form (>1000 mPa·s). These inks are water-soluble and water-dilutable. When they are used, a value in the range from 40 to 60 lines per cm is advisable for the screen of a printed plate 10 used in gravure printing.

In the case of pigments in the region of the upper limit mentioned for the particle size, it is also possible to use a coarser screen of up to 32 lines per cm (about 1000 wells per cm$^2$) and in the case of pigments in the region of the lower limit, it is possible to use a finer screen of up to 80 or 100 lines per cm (6400 or 10 000 wells per cm$^2$).

In the case of a printing plate 10 used in gravure printing, as shown in FIG. 2, the depth of the wells 11 is determined by a tip angle of a needle used for engraving the printing plate 10. This angle, which is also determined by the viscosity of the ink used, may advantageously be, for example, 1200. The area predetermined by the screen dimensions, the well shape, and the depth determine the scoop volume of a well 11. Here, it is advantageous if the shape of the wells 11 is described by a rhombus in which a diagonal (DL) running in the longitudinal direction of a cylindrical printing plate 10 is larger than a diagonal (DQ) running in the circumferential direction of the cylinder. Larger particles that exceed a depth of the well of, for example, 40 µm, can when aligned along the diagonal (DL), easily be accommodated in the well 11 and can be applied to a pad or directly to the paper layer 3 upon printing.

As is already evident from the above disclosure, the present invention is not limited to the working example described but includes all means and measures having the same effect in the context of the invention. Thus, for example, it is also within the scope of the invention if another printing process, such as, for example, flexographic printing, offset printing, or rotary screen printing, is used.

Furthermore, the specific parameters of a gravure printing process, in particular of the printing plate 10 described by way of example, can differ from those described, in particular with regard to the geometry of the wells 11, without departing from the scope of the invention. It has not been mentioned so far that a needle which has the shape of a truncated pyramid can also advantageously be used for engraving the printing plate 10. The use of such a needle, which is indicated by the uniform base areas 13 in FIG. 2, makes it possible to vary the scoop volume in a desired manner by the creation of gentler or steeper walls 14 of the wells 11.

The distribution of mica or other effects in the decorative image of the decorative sheet 1 according to one embodiment of the present invention may result from a structure or pattern of a printing cylinder which determines the printed image or may be printed as "all over" onto the paper layer 3. In the latter case, the effect zones being arranged in an "uncontrolled" manner, i.e. without a pattern repeating itself in a structurally identical manner, on the surface of the decorative sheet 1. The decorative sheet 1 can also be provided with certain reference marks, which is advantageous particularly when the decorative sheet 1 is to be cut into smaller sheets of about the same size and after this cutting is to be processed on a short-cycle press or is to be processed without cutting on a continuous press to give laminates having a structurally identical decoration. In this case, the effect zones of the transparent overlay 1 should be congruent—at least at defined points—with the printed image of decorated paper 7 present underneath.

While the above description constitutes the preferred embodiment of the present invention, it will be appreciated that the invention is susceptible to modification, variation, and change without departing from the proper scope and fair meaning of the accompanying claims.

What is claimed is:

1. A laminate comprising a substrate, an abrasion-resistant decorative sheet, and an imprinted decorative paper between the decorative sheet and the substrate for the production of a laminate floor or a furniture surface, the decorative sheet including:
   a paper layer having an impregnation that is formed from a first plastic mixture;

a print layer on a first side of the paper layer, the print layer containing only pigments having particle sizes within at least one range selected from the group consisting of a first range of 5-125 μm providing a sparkling effect and a second range of less than 5 μm providing a silky effect;

a abrasion-reducing layer on a second side of the paper layer that is opposite the first side of the paper layer, the abrasion-reducing layer being formed from a second plastic mixture that includes a particulate abrasion-reducing material;

wherein the imprinted decorative paper is arranged between the abrasion-reducing layer and the substrate; and wherein the second side faces the substrate and the print layer on the first side forms an outside surface of the laminate.

2. The laminate of claim 1, wherein the paper layer has a specific base paper mass between about 15 to 35 g/m$^2$.

3. The laminate of claim 1, wherein at least one of the first plastic mixture or the second plastic mixture comprises an amino resin.

4. The laminate of claim 3, wherein the amino acid is a melamine-formaldehyde resin.

5. The laminate of claim 1, wherein the particulate abrasion-reducing material is one selected from the group of corundum or silicon carbide, having a particle size distribution between about F 120 to F 280 according to FEPA standard.

6. The laminate of claim 1, wherein the proportion of the particulate abrasion-reducing material, when based on 100 parts by mass of the second plastic mixture, is between about 5 to 80 parts by mass.

7. The laminate of claim 6, wherein the proportion of the particulate abrasion-reducing material is between about 20 to 40 parts by mass.

8. The laminate of claim 1, wherein the specific mass of the abrasion-reducing layer containing the particulate abrasion-reducing material is between 5 to 80 g/m$^2$.

9. The laminate of claim 1, further comprising that the decorative sheet contains a residual moisture after curing and drying between 3% by mass to 9% by mass.

10. The laminate of claim 1, wherein the paper layer comprises a specific mass in the range from 60 to 250 g/m$^2$.

11. The laminate of claim 1, wherein the thickness of the print layer is in the range from about 4 μm to 40 μm.

12. The laminate of claim 1, wherein the decorative sheet has an abrasion value of at least a class AC3 according to DIN EN 13329.

13. The laminate of claim 1, further comprising a further paper laminated with the substrate on the side opposite the abrasion-resistant decorative sheet.

* * * * *

UNITED STATES PATENT AND TRADEMARK OFFICE
CERTIFICATE OF CORRECTION

PATENT NO. : 8,481,147 B2
APPLICATION NO. : 12/141469
DATED : July 9, 2013
INVENTOR(S) : Stefan Barwich et al.

Page 1 of 1

It is certified that error appears in the above-identified patent and that said Letters Patent is hereby corrected as shown below:

In the Claims

In claim 1, column 9, line 6, before "abrasion", delete "a" and insert --an--.

Signed and Sealed this
Third Day of September, 2013

Teresa Stanek Rea
*Acting Director of the United States Patent and Trademark Office*